Feb. 7, 1928.
A. G. RONNING ET AL
1,658,353
COMBINATION TRACTION IMPLEMENT
Original Filed April 30, 1920   3 Sheets-Sheet 2
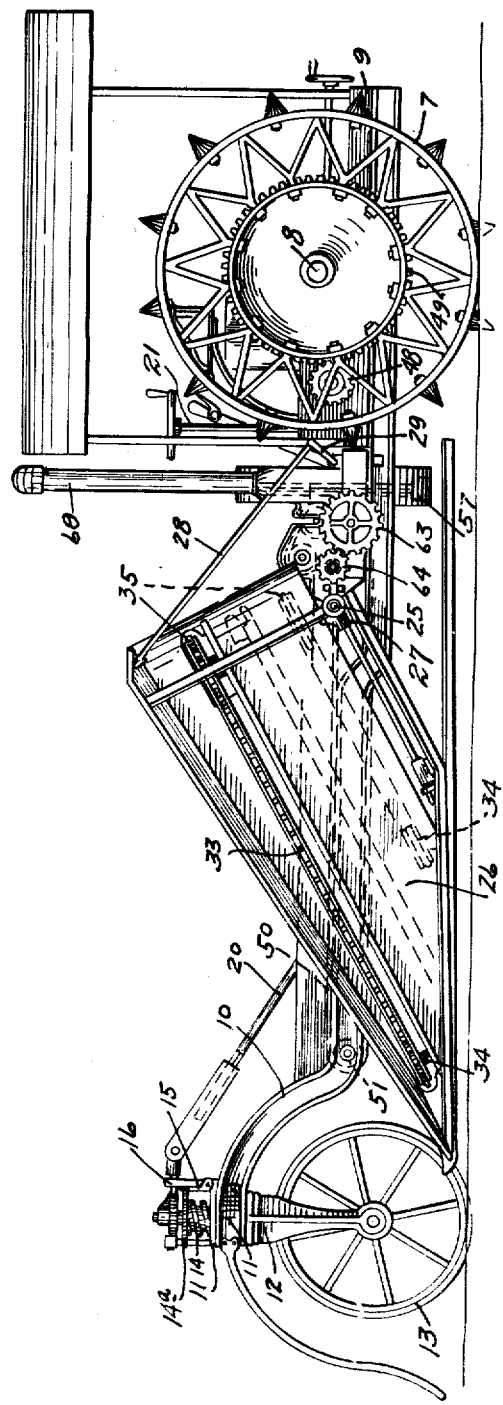
INVENTORS
Andrean G Ronning
Adolph Ronning
BY THEIR ATTORNEYS

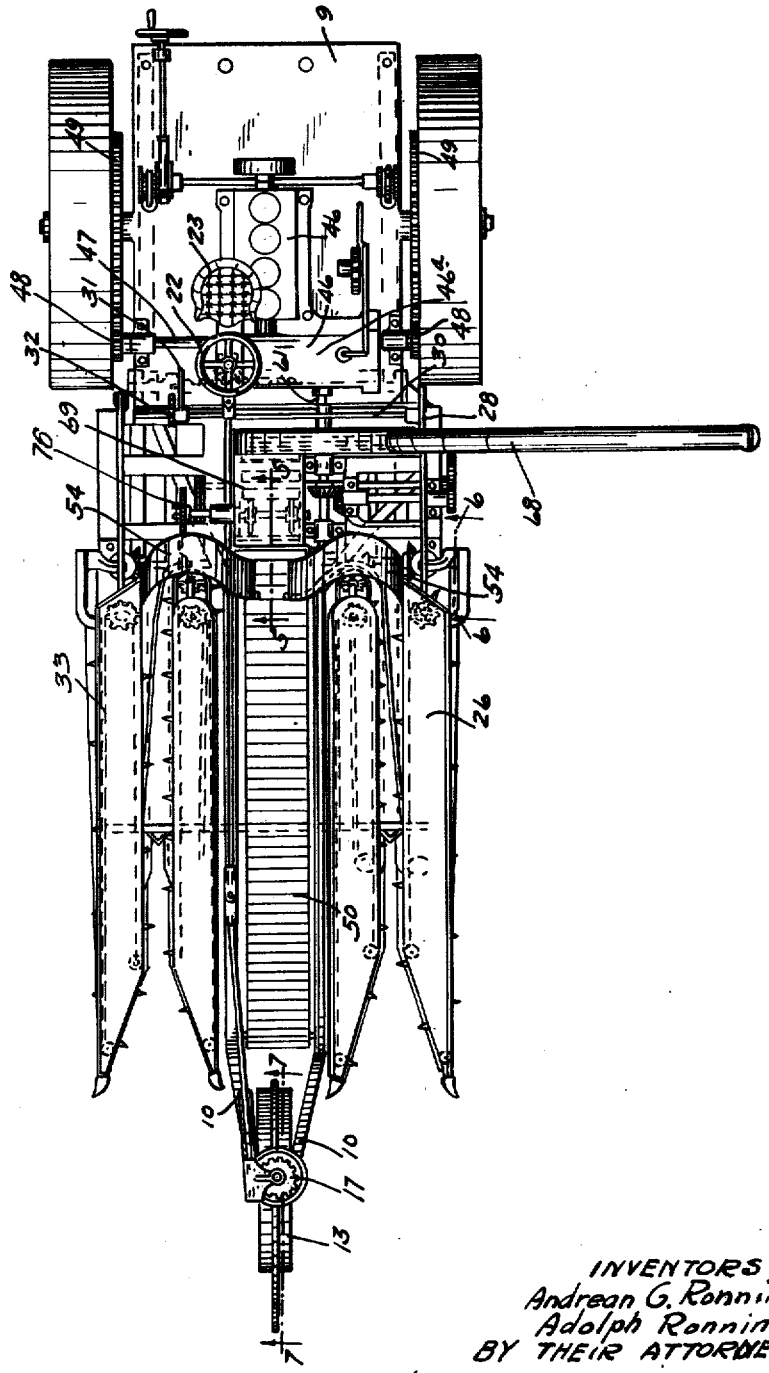

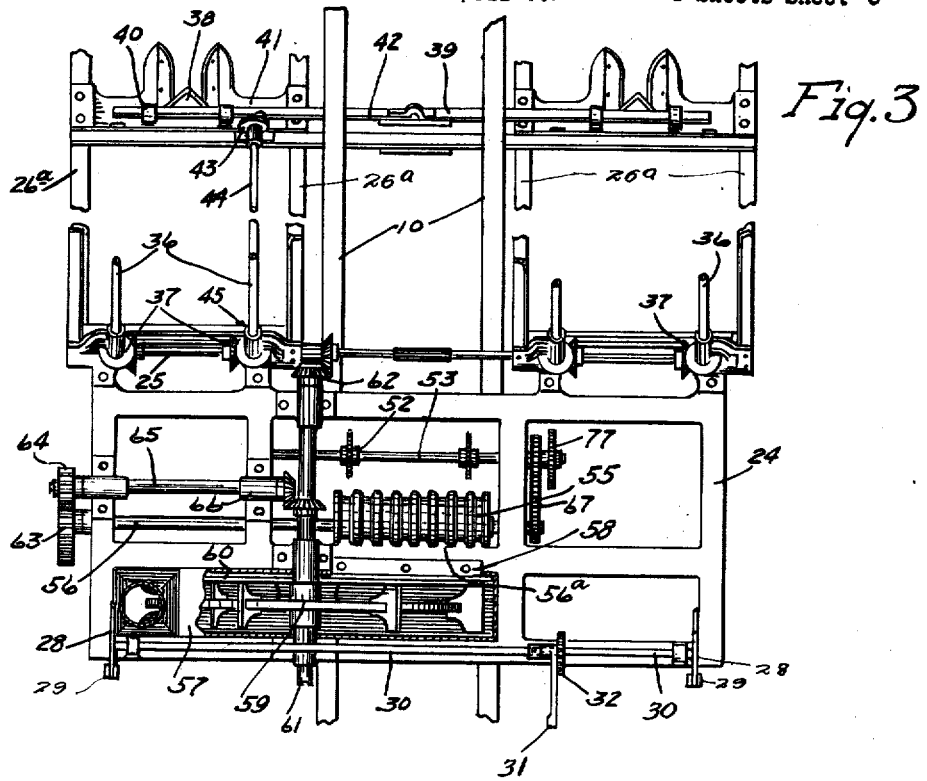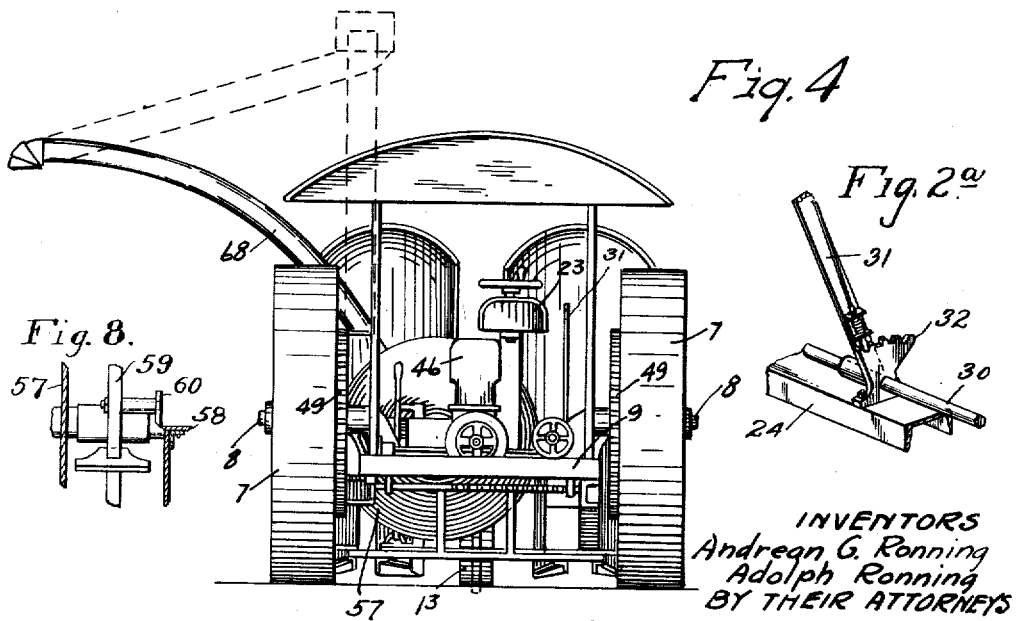

Patented Feb. 7, 1928.

1,658,353

UNITED STATES PATENT OFFICE.

ANDREAN G. RONNING AND ADOLPH RONNING, OF MINNEAPOLIS, MINNESOTA.

COMBINATION TRACTION IMPLEMENT.

Original application filed March 6, 1916, Serial No. 82,516. Divided and this application filed April 30, 1920, Serial No. 377,855. Renewed September 19, 1924.

Our present invention is directed particularly to an improved ensilage harvester and is filed as a division of our pending application S. N. 82,516, filed March 6th, 1916, entitled "Combination tractor implements", and which application matured into Letters Patent of the United States, of date, May 18th, 1920, No. 1,340,461.

The novelty of the present invention resides largely in the ensilage harvester and the manner in which the same is combined in a tractor and a pneumatic ensilage elevator, in which latter the fan and the ensilage cutters are combined.

One broadly new feature herein disclosed and claimed is found in the arrangement of duplex gathering and stalk cutting mechanism, a common ensilage cutter and means for delivering the cut stalks from the duplex cutter and gathering devices to such common ensilage cutter.

A further novel feature is found in the manner in which the invention above broadly stated is combined with the pneumatic elevator. A still further object is to provide a novel frame work construction in connection with the harvester for mounting the same in advance of the tractor, the forward end of the frame work being adjustably carried, for vertical adustment, by a supporting carriage, while the rear end is secured to the tractor so as to support the latter in a rigid manner with respect to the frame construction. Various other important novel features will appear in the following detailed description.

In the accompanying drawings which illustrate the invention, like characters indicate like parts throughout the several views.

Referring to the drawings:

Fig. 1 is a plan view showing the complete machine;

Fig. 2 is a side elevation of the same;

Fig. 2ª is a fragmentary perspective view showing the lifting lever and cooperating segment;

Fig. 3 is a plan view with some parts sectioned and some parts broken away, showing the front frame structure, the primary or stalk cutters, the combined fan and ensilage cutter and various other associated parts;

Fig. 4 is a rear elevation of the machine;

Fig. 5 is a section taken approximately on the line 5—5 of Fig. 1;

Fig. 6 is a detail in section taken approximately on the line 6—6 of Fig. 1;

Fig. 7 is a section on the line 7—7 of Fig. 1, some parts being broken away; and Fig. 8 is a fragmentary view showing a portion of the fan head and a cutting knife thereon.

The tractor has laterally spaced rear traction wheels 7 journaled on a rear axle 8 suitably supported by a rear platform and frame structure 9 that is rigidly secured to the rear ends of a pair of long laterally spaced beams 10, the front ends of which are upwardly curved and rigidly secured to a head 11 in which is swiveled a forked steering wheel bracket 12 to which the front steering wheel 13 is journaled. This construction, as shown, is merely illustrative of the general idea embodied, and for all practical purposes the forward portions of the beams 10 may be considered as forming a supporting frame for the harvesting machinery, while their rear portions, which are secured to the tractor, may be considered as push bars for the supporting frame.

To provide for vertical adjustments of the front ends of the frame beams 10, the vertical stem 12ª of the wheel bracket 12, instead of being directly swiveled in the head 11, is directly swiveled in a sleeve 14 that works with threaded engagement in the head 11 and has a peripherally notched disklike projecting lock flange 14ª. The notches of the flange 14ª are adapted to be engaged by a lock dog 15 shown as pivoted on a supporting post 16 rigidly secured to the front ends of the beams 10. A worm gear 17 is secured to the extreme upper end of stem 12ª, and this worm gear is engaged by a worm 18 in the front end of a short shaft 19 that is journaled in the post 16 and other suitable support, and is connected by a knuckle joint to the front end of a steering shaft 20 that extends to the rear of the machine and is connected by a knuckle joint to a steering post 21 having a suitable hand wheel 22 located within reach from the operator's seat 23.

The numeral 24 indicates a supplemental frame that is rigidly but preferably detachably secured to the frame beams 10 and to the front portion of the platform structure 9 of the tractor. The numeral 25 indicates a transverse shaft mounted in suitable bearings on the front portion of the supplemental frame 24, and which bearings include lugs 26ᵇ, best shown in Fig. 6.

The numeral 26 indicates forwardly projected laterally spaced pairs of gathering frames located, one pair on each side of the front portions of the two beams 10, the members of the said pairs having diverging forward portions to facilitate the gathering actions, simultaneously, on two rows of standing corn stalks. At their lower rear portions, these gathering frames have bearings 27 (see Fig. 6) that are pivoted on or around the transverse shaft 25, so that the forward portions of the said gathering frames are capable of vertical adjustments. For imparting such vertical adjustments to said gathering frame, links 28 (see Figs. 1 and 2) are connected to the upper rear portions of said frames and to arms 29 on a rock shaft 30, mounted in suitable bearings on the supplemental frame 24 and provided with a latch lever 31 that cooperates with a latch segment 32 rigidly secured on said frame 24, (see also Fig. 2ᵃ). At their lower rear portions, the co-operating members of the pairs of gathering frames will be suitably cross tied for common vertical adjustments or pivotal movements on shaft 25.

Working on the gathering frame 26 are oblique tooth-equipped gathering chains 33 that run over idle sprockets 34 on said frame and over driving sprockets 35 on obliquely upright shafts 36. The shafts 36 are journaled in suitable bearings on the gathering frames 26 and are driven from the shaft 25 through co-operating beveled gears 37 (see Fig. 3).

Working close to the ground and movable across the space between the gathering frames and just below the gathering chains and gathering frames are primary stalk cutters afforded by sickle blades 38 secured to a transversely movable sickle bar 39 mounted in guides 40 on bearing plates 41 rigidly secured to lower bars 26ᵃ of the respective gathering frames.

The sickle bar 39 is reciprocated through a pitman 42 connected to the intermediate portion thereof and to a crank 43 on the front end of a shaft 44 mounted in suitable bearings on the underframe structure 26ᵃ and driven from the shaft 25 through intermeshing beveled gears 45.

Mounted on the platform structure of the tractor is a motor, preferably an internal combustion engine 46. The crank shaft of this engine will drive the traction wheels 7 through suitable transmission mechanism, which, as shown, includes a jack shaft 47 provided at its ends with pinions 48 that mesh with large spur gears 49 carried by the respective traction wheels. The jack shaft 47 will preferably be the usual divided shaft driven through a differential gear and variable speed reversing mechanism of well known construction.

Working between the forward portions of the frame beams 10 is a horizontally traveling feed belt 50 arranged to travel over suitable guides including a roller 51 at the forward portions of said beams 10 and driving sprockets or wheels 52 carried by a shaft 53 journaled in suitable bearings on the supplemental frame 24. (See Figs. 2 and 3.)

The numeral 54 (see Fig. 1), indicates deflecting plates or hoods of curved form rigidly secured to the outer gathering frames 26 and spaced from but extended around the rear portions of the inner gathering frames so as to cause the cut stalks carried rearward by the gathering chains 33 to fall onto the conveyor belt 50, head ends forward and butt ends rearward.

The conveyor belt 50 delivers the stalks, butt ends rearward, to the ensilage cutter, but first to a feed roller 55 carried by a cross shaft 56 journaled in suitable bearings on the supplemental frame 24.

The roller 55 co-operates with a notched comb plate 56ᵃ secured on the frame 24, and the said roller delivers the stalks to a combined fan and ensilage cutter, including a fan casing 57 supported by the supplemental frame 24 and having a fixed shearing blade 58. Working within the fan casing 57 is a blade-equipped fan head 59 that carries knives 60 that co-operate with the fixed shearing blade 58 to cut the stalks into ensilage to be immediately subjected to the action of the fan or blower. The fan head 59 is carried by a longitudinal shaft 61, which, at its rear end, is connected to or driven from the transmission mechanism of the engine, and which transmission mechanism is not shown, but is contained within a gear housing 46ᵃ and, as stated, may be of any suitable well known construction. Shaft 61 is mounted in suitable bearings on the supplemental frame 24 and drives the cross shaft 25 through intermeshing beveled gears 62.

The roller shaft 56, at its outer end, has a spur gear 63 that meshes with a spur pinion 64 on the outer end of a short cross shaft 65 journaled in suitable bearings on the supplemental frame 24 and driven from the shaft 61 through intermeshing beveled gears 66. At its inner end, roller shaft 56 is connected to feed belt shaft 53 through a sprocket and chain drive 67 (see Fig. 3).

The fan casing 57, as an important feature of this invention, is provided with an extended ensilage delivery spout 68, so that the fan, together with this spout, afford a pneumatic elevator for delivering the cut ensilage into a vehicle driven at the side of the harvester, or otherwise connected to move with the harvester.

Working over the delivery portion of the central feed belt 50 and over the lower feed roller 55 is an endless overhead feed belt 69 that runs over rollers 70 and 71. The roller 70 is on a shaft 72 journaled in bearing plates 73 on the frame beams 10. The roller 71 is on a shaft 74 that moves in slots 75 formed in the plates 73 concentric to the axis of the shaft 72. The roller shaft 74 is preferably spring-pressed downward. Roller shaft 72 is provided with a spur gear 76 that meshes with a spur gear 77 on one end of the shaft 53 so that the said overhead feed device is driven in the proper direction from shaft 53.

The operation of the machine described is probably obvious from the foregoing description but may be briefly summarized as follows:

Under the advance movement of the machine, two rows of standing corn stalks will be simultaneously gathered between the two pairs of gathering plates and will be severed from the ground by primary stalk cutters and carried by the conveying or gathering belt against the hoods or deflecting plates, and thence onto the endless conveying belts 50, onto which latter the stalks will be turned by the deflecting plates or hoods, head ends forward, and butt ends rearward. By the conveying belt 50 the cut stalks will be fed butt ends first or rearward, first onto the lower feed roller 55 and under the overhead feed belt 69, and from thence, to the combined fan and ensilage cutter. The overhead feed belt 69 will freely rise and fall and adapt itself to stalks, but will co-operate with the lower feed belt to insure positive and even feed of the corn stalks to the ensilage cutter. The stalks will pass over roller 55 and under the belt 69 onto the cutter blade 58. The knives 60 on the fan head rotate in close relation to this plate and the stalks will thus be cut by these knives 60. The cut pieces will drop into the fan casing and will be ejected therefrom by the fan blades and conveyed out through the conduit 68.

The corn stalks cut into ensilage will, by the fan, be thrown outward by centrifugal force and carried by the air blast through the elevator spout 68 into the vehicle or receptacle positioned to receive the same.

What we claim is:

1. In a traveling ensilage harvester, stalk gathering means, a primary stalk cutter, a combined fan and ensilage cutter including a fan casing carrying a delivery spout, knives carried by the fan head, and means for delivering the stalks from said primary cutter to the ensilage cutting knives, said latter means including a device for turning the stalks, head ends forward and butt ends rearward, so that they will be thus fed, butt ends first to said ensilage cutting knives.

2. In a traveling ensilage harvester, the combination with gathering frames, gathering belts and means for driving said gathering belts, of an endless feed belt movable at the side of one of said gathering frames, a combined fan and ensilage cutter, including a fan casing having a delivery spout, and means other than said feed belt comprising deflecting plates co-operating therewith to deliver the stalks endwise to said combined fan and ensilage cutter.

3. In a traveling ensilage harvester, the combination with gathering frames, gathering belts and means for driving said gathering belts, of an endless feed belt movable at the side of one of said gathering frames, a combined fan and ensilage cutter, including a fan casing having a delivery spout, means other than said feed belt comprising curved deflecting plates co-operating therewith to deliver the stalks endwise to said combined fan and ensilage cutter, and an engine with connections for driving said tractor, said feed cutting and co-operating feed devices and combined fan and ensilage cutter.

4. In a traveling ensilage harvester, the combination with a pair of gathering frames, gathering belts and means for driving said gathering belts, of an endless feed belt movable between said gathering frames, a combined fan and ensilage cutter, including a fan casing having a delivery spout, and means other than said feed belt co-operating therewith to deliver the stalks endwise to said combined fan and ensilage cutter, said means including a lower feed roller and a floating overhead feed device.

5. In a traveling ensilage harvester, the combination with gathering frames, gathering belts and means for driving said gathering belts, of an endless feed belt movable at the side of one of said gathering frames, a combined fan and ensilage cutter, including a fan casing having a delivery spout, means other than said feed belt comprising deflecting plates co-operating therewith to deliver the stalks endwise to said combined fan and ensilage cutter, said means including a lower feed roller and a floating overhead feed device, and an engine having connections for driving said tractor and for driving said feed belt, lower feed roller, overhead feed device and combined fan and ensilage cutter.

6. In a traveling ensilage harvester, the combination with a pair of duplex stalk gathering devices and primary cutting devices, of an endless conveyor disposed therebetween and receiving therefrom, deflecting means co-operating therewith, an ensilage cutter carried on said harvester and positioned and arranged to simultaneously receive the corn stalks from both of said gathering devices and to cut the same into ensilage.

7. In a traveling ensilage harvester, the combination with duplex gathering and primary cutting devices, of a feed belt operative between and receiving from said gathering devices, an ensilage cutter receiving from said feed belt, and means other than said feed belt co-operating therewith to effect the delivery of the stalks endwise to said ensilage cutter.

8. In a traveling ensilage harvester, the combination with duplex gathering and primary cutting devices, of a feed belt working between and receiving from said gathering devices, a combined fan and ensilage cutter receiving from said feed belt, and means other than said feed belt co-operating therewith to feed the stalks endwise to said combined fan and ensilage cutter, said fan comprising a casing having an extended delivery spout.

9. In a traveling ensilage harvester, the combination with duplex gathering and primary cutting devices, of a feed belt working between and receiving from said gathering devices, a combined fan and ensilage cutter receiving from said feed belt, and a power driven feed roller and floating overhead feed devices co-operating with said feed belt to effect the endwise delivery of the stalks to said combined fan and ensilage cutter, said fan comprising a casing having an extended delivery spout.

10. In a traveling ensilage harvester, the combination with a framework supported at the rear by traction wheels and in the front by wheel-equipped steering means, of means for vertically adjusting the front portion of said frame, gathering frames and stalk feeding devices thereon, mounted on said main frame for vertical pivotal adjustments, means for holding said frames in different vertical positions, a primary stalk cutter, and an ensilage cutter carried by the tractor and receiving the stalks from said gathering and feeding means.

11. A traveling ensilage harvester having in combination a pair of duplex gathering devices, an endless conveyer traveling therebetween, deflecting means at one end of each of the gathering devices adapted to deflect the cut stalks of ensilage onto the said conveyer with their head ends foremost, gripping and feeding devices comprising a roller and an endless conveyer disposed over said roller and partially over the said first named conveyer and an ensilage cutter and delivering means to which said gripping and feeding devices deliver the stalks.

12. The combination with a tractor unit having laterally spaced traction devices, of a frame extending forwardly from the tractor unit and supporting the front end thereof, a steering member secured to the front end of said frame, and an implement supported by the frame in an intermediate position between the traction devices and said steering member.

13. The combination with a tractor unit having laterally spaced traction devices, a frame rigidly secured to the unit and extending in advance thereof, a steering member at the front end of the frame means whereby said steering member may be controlled from the tractor unit, and a working member supported by said frame in advance of said tractor unit and rearwardly of the steering member.

14. The combination with a tractor primarily supported by a pair of laterally arranged traction wheels, an auxiliary frame secured to and extending in advance of the tractor to form a second support for the tractor to prevent it from tilting on the axis of the traction wheels, means for supporting and steering the front end of said auxiliary frame, and a working element arranged on the frame in advance of the tractor and rearwardly of the steering means so as to receive ground support from both the traction wheels and the steering means.

15. The combination with a tractor having a power unit and traction wheels, of a frame rigidly secured to and extending forwardly of the tractor, a steering member supporting the front end of the frame, a working implement supported by the frame rearwardly of the steering member, and an operative connection between the implement and the power unit.

16. The combination consisting of, a tractor having laterally arranged traction wheels, a frame secured to and extending forwardly from the tractor and supported at its front end by a steering device, means whereby said steering member may be controlled from the tractor, a working implement arranged on the frame forwardly of the tractor and rearwardly of the steering device so as to be operable in advance of the traction wheels, said implement having means below the level of the frame for acting upon material as the machine moves forward.

17. A harvester attachment for tractors comprising a supporting frame disposed under part of the harvesting machinery, a wheel mounted in said frame for supporting the same, and push bars extending back from said frame and adapted to support the front end of a tractor and for attachment with the rear portion thereof.

18. A harvester attachment for tractors comprising a supporting frame upon which the harvesting machinery is adjustably carried, a wheel mounted under said frame for supporting the same, and push bars extending back from said frame for attachment with a tractor.

19. A harvester attachment for tractors comprising a supporting frame, a tilting frame structure carrying harvesting machinery pivoted to said supporting frame, push bars extending from the supporting frame for attachment with a tractor, a lever member extending from said harvesting machinery frame structure adjacent to one of said push bars, and means for fastening said lever in adjusted position with relation to said supporting frame.

20. A harvester attachment for a tractor including a frame structure adapted to be attached to the rear end and support the front end of the tractor and extend forwardly thereof and having a wheel for supporting and steering the harvester, and a frame structure extending to one side thereof upon which harvesting machinery is carried.

21. A harvester attachment for a tractor comprising a supporting frame upon which harvesting machinery is carried, a wheel mounted under said frame for supporting the same, and push bars extending back from said frame adapted to extend along the sides of the tractor and be connected therewith.

22. An implement attachment for unstabilized tractors comprising a supporting frame having push bars extending back and secured to the tractor so as to support the tractor in a horizontal position, steering means supporting the front end of the frame, and an implement carried by the frame rearwardly of the steering means.

23. An implement attachment for unstabilized tractors comprising a supporting frame having push bars extending back and secured to the tractor so as to support the tractor in a horizontal position, steering means supporting the front end of the frame, and an implement carried by the frame rearwardly of the steering means, said implement having means below the level of the frame for engaging and acting upon material as the machine moves forward.

24. An implement attachment for unstabilized tractors comprising a supporting frame having push bars extending back and secured to the tractor so as to support the tractor in a horizontal position, steering means supporting the front end of the means supporting the front end of the frame, an implement carried by the frame rearwardly of the steering means, said implement having means for engaging material as the machine moves forward, and controls for adjusting the position of the material engaging means with respect to the frame.

25. An implement attachment for unstabilized tractors comprising a supporting frame arranged in advance of the tractor and extending back and secured to the tractor so as to support the tractor in a horizontal position, steering means supporting the front end of the frame and controlled from the tractor, and an implement carried by the frame rearwardly of the steering means.

26. An implement attachment for unstabilized tractors comprising a supporting frame arranged in advance of the tractor and extending back and secured to the tractor so as to support the tractor in a horizontal position, steering means supporting the front end of the frame and controlled from the tractor, an implement carried by the frame rearwardly of the steering means and in advance of the tractor, and controls extending from the implement to within reach of the operator of the tractor.

27. An implement attachment for unstabilized tractors comprising a supporting frame arranged in advance of the tractor and extending back and secured to the tractor so as to support the tractor in a horizontal position, steering means supporting the front end of the frame and controlled from the tractor, an implement carried by the frame rearwardly of the steering means, and a power connection for driving the implement from the engine of the tractor.

28. An implement attachment for unstabilized tractors comprising a supporting frame arranged in advance of the tractor and extending back and secured to the tractor so as to support the tractor in a horizontal position, steering means supporting the front end of the frame, and a harvester implement carried by the frame and comprising a pair of stalk gathering devices adapted to act on two rows of crop as the machine moves forward.

29. An implement attachment for unstabilized tractors comprising a supporting frame arranged in advance of the tractor and extending back and secured to the tractor so as to support the tractor in a horizontal position, steering means supporting the front end of the frame, and a harvester implement carried by the frame and comprising a pair of stalk gathering devices and an ensilage cutter adapted to receive stalks from both of said gathering devices.

30. In a travelling ensilage harvester the combination including a pair of stalk gathering and cutting devices for gathering and severing two rows of stalks as the machine moves forward, an ensilage cutter, and means for conveying the severed stalks from both of the gathering devices and into the ensilage cutter.

31. The combination with a tractor which comprises a motor and traction wheels and transmission, of a frame rigidly attached to said tractor and extending forwardly thereof, the steering wheel unit for said tractor being applied at the front portion of said extended frame, and a working unit applied to said frame at the rear of said steering wheel unit and in front of said tractor.

32. In a tractor, the combination with a power unit including a motor and traction wheels and transmission, of a frame rigidly and detachably connected to said power unit and extended in advance thereof, a front steering wheel unit, the front portion of said frame having means whereby said steering wheel unit may be coupled thereto, and a working unit applied to said frame rearwardly of said steering wheel unit and in front of said power unit.

33. The combination with that part of a tractor which constitutes the power unit thereof and comprises a motor and traction wheels and transmission, of a frame rigidly attached to said power unit and extended in front thereof, a steering wheel unit supporting the front end of said extended frame, a working unit applied to said frame at the rear of said steering wheel unit and in front of said power unit, an operator's seat carried by the power unit, and steering connections for said steering wheel unit extended therefrom rearwardly and terminating in an element within reach of and operative by the operator when seated on said seat.

In testimony whereof we affix our signatures.

ANDREAN G. RONNING.
ADOLPH RONNING.

to said frame at the rear of said steering wheel unit and in front of said tractor.

32. In a tractor, the combination with a power unit including a motor and traction wheels and transmission, of a frame rigidly and detachably connected to said power unit and extended in advance thereof, a front steering wheel unit, the front portion of said frame having means whereby said steering wheel unit may be coupled thereto, and a working unit applied to said frame rearwardly of said steering wheel unit and in front of said power unit.

33. The combination with that part of a tractor which constitutes the power unit thereof and comprises a motor and traction wheels and transmission, of a frame rigidly attached to said power unit and extended in front thereof, a steering wheel unit supporting the front end of said extended frame, a working unit applied to said frame at the rear of said steering wheel unit and in front of said power unit, an operator's seat carried by the power unit, and steering connections for said steering wheel unit extended therefrom rearwardly and terminating in an element within reach of and operative by the operator when seated on said seat.

In testimony whereof we affix our signatures.

ANDREAN G. RONNING.
ADOLPH RONNING.

CERTIFICATE OF CORRECTION.

Patent No. 1,658,353.    Granted February 7, 1928, to

ANDREAN G. RONNING ET AL.

It is hereby certified that error appears in the above numbered patent requiring correction as follows: In the heading to the drawings, date of filing, for April 30, 1920, read March 6, 1916; page 1, of the printed specification, line 30, for the misspelled word "adustment" read "adjustment"; page 5, claim 24, strike out line 53, comprising the words "means supporting the front end of the"; and that the said Letters Patent should be read with these corrections therein that the same may conform to the record of the case in the Patent Office.

Signed and sealed this 8th day of May, A. D. 1928.

(Seal)

M. J. Moore,
Acting Commissioner of Patents.

CERTIFICATE OF CORRECTION.

Patent No. 1,658,353.                        Granted February 7, 1928, to

ANDREAN G. RONNING ET AL.

It is hereby certified that error appears in the above numbered patent requiring correction as follows: In the heading to the drawings, date of filing, for April 30, 1920, read March 6, 1916; page 1, of the printed specification, line 30, for the misspelled word "adustment" read "adjustment"; page 5, claim 24, strike out line 53, comprising the words "means supporting the front end of the"; and that the said Letters Patent should be read with these corrections therein that the same may conform to the record of the case in the Patent Office.

Signed and sealed this 8th day of May, A. D. 1928.

(Seal)                                                                      M. J. Moore,
                                                                             Acting Commissioner of Patents.